United States Patent
Mitts et al.

(10) Patent No.: US 6,865,262 B1
(45) Date of Patent: Mar. 8, 2005

(54) METHOD FOR CALCULATING ADVICE OF CHARGE

(75) Inventors: Håkan Mitts, Helsinki (FI); Jarno Pelkonen, Espoo (FI); Kalevi Ratschunas, Vantaa (FI); Kengatharan Sivalingam, Helsinki (FI); Sami Uskela, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/889,310

(22) PCT Filed: Jan. 18, 2000

(86) PCT No.: PCT/FI00/00060

§ 371 (c)(1),
(2), (4) Date: Oct. 11, 2001

(87) PCT Pub. No.: WO00/45609

PCT Pub. Date: Aug. 3, 2000

(30) Foreign Application Priority Data

Jan. 29, 1999 (FI) .................................. 990170

(51) Int. Cl.7 ............................................ H04M 15/00
(52) U.S. Cl. ............................ 379/114.02; 379/114.01; 379/114.03; 379/114.05; 455/406
(58) Field of Search ....................... 379/114.01, 114.02, 379/114.05, 114.15, 114.17, 114.18, 121.02, 122, 124; 455/406, 407, 408

(56) References Cited

U.S. PATENT DOCUMENTS

| | | | |
|---|---|---|---|
| 5,109,401 A | | 4/1992 | Hattori et al. |
| 5,148,474 A | * | 9/1992 | Haralambopoulos et al. .... 379/114.25 |
| 5,303,297 A | * | 4/1994 | Hillis .......................... 455/406 |
| 5,577,100 A | | 11/1996 | McGregor et al. |
| 5,809,122 A | * | 9/1998 | Jang ........................... 379/140 |
| 6,195,543 B1 | * | 2/2001 | Granberg .................... 455/407 |
| 6,198,915 B1 | * | 3/2001 | McGregor et al. .......... 455/406 |
| 6,671,285 B1 | * | 12/2003 | Kirkby et al. .............. 370/468 |

FOREIGN PATENT DOCUMENTS

| | | |
|---|---|---|
| EP | 813 332 | 12/1997 |
| WO | WO 98/59504 | 12/1998 |

* cited by examiner

*Primary Examiner*—Quoc Tran
(74) *Attorney, Agent, or Firm*—Pillsbury Winthrop LLP

(57) ABSTRACT

To diversify the calculation of advice of charge, a price definition element (AoC-I) is maintained in a telecommunications system. In order to use the correct price definition element (AoC-I), an indication of the price definition element (AoC-I) to be used in calculating the advice of charge of a service is associated with the service. The advice of charge of the service is calculated by the indicated price definition element (AoC-I).

19 Claims, 2 Drawing Sheets

METHOD FOR CALCULATING ADVICE OF CHARGE

BACKGROUND OF THE INVENTION

The invention relates to advice of charge of calls and especially to advice of charge in a cellular mobile system utilizing an intelligent network, in which system the service provider can use in its service the services of other service providers and/or different network operators.

The subscriber of a telecommunications network—for instance a fixed network or a mobile network—can be offered a large number of different services by means of an intelligent network (IN). One such service is advice of charge which gives the caller an estimate on the charge of the made call. Calculating an advice of charge is generally supported by means of the intelligent network. A mechanism for calculating an advice of charge generally used in mobile networks is that the tariff level of the call is known on the basis of the dialled number and mobile subscription type (subscriber class mark). The tariff level can also be obtained from a service control point (SCP) of the intelligent network. The tariff level indicates the single-fee charge or time charge valid at each point of time. In other words, the tariff level indicates the AoC (advice of charge) E parameters valid at each point of time. The E parameters indicate how often and how many advice of charge pulses are generated. A specific price has been defined for the advice of charge pulse. The E parameters indicate, for instance, any free-of-charge time in the beginning of the call, the advice of charge pulses to be generated after the free-of-charge time has expired, advice of charge pulses being generated at specific intervals and the time between them. Either single-fee charging or time charging can be applied to a call. The used advice of charge algorithm is, however, always the same.

In providing services, the trend is towards using multi-provider environments in which a single service can use resources offered by several value added service providers and content providers. In addition, a service provider does not necessarily maintain the telecommunications network itself, but may buy the necessary network service from a network operator. The service can thus comprise a content service, a supplementary-service logic and an access service. Calculating the advice of charge of such a service requires the use of several different charging parameters. The total price of the service comprises the price of the content, the user charge of the supplementary-service logic and the price of the connection. Different content services (with different prices) of several different content providers can be used through the same service logic, and the logic can be used in the networks of several different operators whose connection services naturally have different prices. Thus, the number of combinations available for providing the service becomes very large. In addition, different combinations have different prices. Also, since the different services use different resources, the calculation algorithm of prior art advice of charge with its E parameters cannot provide real-time data on the actual costs.

BRIEF DESCRIPTION OF THE INVENTION

It is thus an object of the invention to develop a method and an apparatus implementing the method so as to solve the above problem. The object of the invention is achieved by a method, system and network element characterized by what is stated in the independent claims. Preferred embodiments of the invention are stated in the dependent claims.

The invention is based on the idea that a price definition element, by which the advice of charge of the service is calculated, is defined separately for each service. The price definition element is a logical element, i.e. a data structure, containing information on the formation mechanism of the service price and on the calculation parameters whose values are used in calculating the advice of charge.

The invention provides the advantage that the calculation mechanism of the advice of charge can be customised for each service to take into consideration all factors affecting the price formation. This way, the advice of charge indicates exactly the actual price of the call, whereby it can also be used in real-time billing. In addition, updating and modifying a single price definition element is simple and easy.

In a preferred embodiment of the invention, the price definition element requests calculation parameter values from other system components participating in providing the service. This embodiment provides the additional advantage that local values can be taken into account in billing. In addition, sponsoring the service and taking it into account in pricing becomes easier: for instance, if a map service map in location A comprises an advertisement, there is no charge for the map (the calculation parameter value is set to zero), but in location B, where there is no advertisement, there is a charge for the map.

In a preferred embodiment of the invention, the advice of charge of the service calculated by the price definition element is forwarded to the billing system. This embodiment provides the additional advantage that it avoids calculating both the advice of charge and billing data in vain. This reduces signalling and load on the network elements.

In a preferred embodiment of the invention, a calculation parameter value which changes during the service is updated into the price definition element. This provides the advantage that it is possible to offer customers services which are more customised than before, which take into consideration the changes in the operating environment in a more versatile manner, and whose advice of charge indicates the correct price to be charged for the service.

In a preferred embodiment of the invention, advice of charge is transmitted at predefined intervals. This further improves the real-timeliness of the price shown to the customer and/or of the billing system.

BRIEF DESCRIPTION OF THE DRAWINGS

In the following, the invention will be described in greater detail in connection with preferred embodiments and with reference to the attached drawings, in which.

DETAILED DESCRIPTION OF THE INVENTION

The present invention can be applied to any data transmission system in which advice of charge is used and services, whose billing is based on other grounds than used time and/or transmitted amount of data, are provided. One such system is the pan-European mobile system GSM (Global System for Mobile Communication) and especially the next generation of it, the GSM 2+. In the following the invention will be described using the UMTS (Universal Mobile telecommunications System) as an example without limiting the invention to this system, however. The UMTS and the IMT-2000 (International Mobile Telecommunications 2000) are third-generation mobile systems currently under development. The UMTS is being standardized in the ETSI (European Telecommunications Standards Institute) and the ITU (International Telecommunications Union) is standardizing the IMT-2000. These future systems are very similar in their basic properties. The specifications of mobile communication systems in general and of the IMT-2000 and UMTS systems in particular evolve rapidly, as do those of the intelligent network. This evolution may require extra changes to the invention. Therefore, all terms and expressions should be interpreted as widely as possible and they are intended to describe and not to limit the invention. It is the function that is essential for the invention and not in which network element or apparatus it is executed.

A telecommunications system implementing the functionality of the present invention comprises not only means needed for implementing prior art services, but also means for maintaining the logical price definition elements used in various advice of charge processes and for calculating advice of charge for individual services using the price definition element indicated by the service. In addition, the system may comprise means for requesting the parameter values needed by the price definition element from the service providers and operators participating in providing the service. The system may also comprise means for forwarding changed parameter values to the price definition element. The telecommunications system may be a system utilizing wireless communication or a system based on a fixed network. The telecommunications system can also be adapted to use advice of charge in billing, in which case the system comprises means for forwarding the advice of charge to the billing system, for instance to the real-time billing of prepaying subscribers. A prepaying subscriber is a subscriber paying in advance, i.e. using prepaid subscription.

Figure 1:
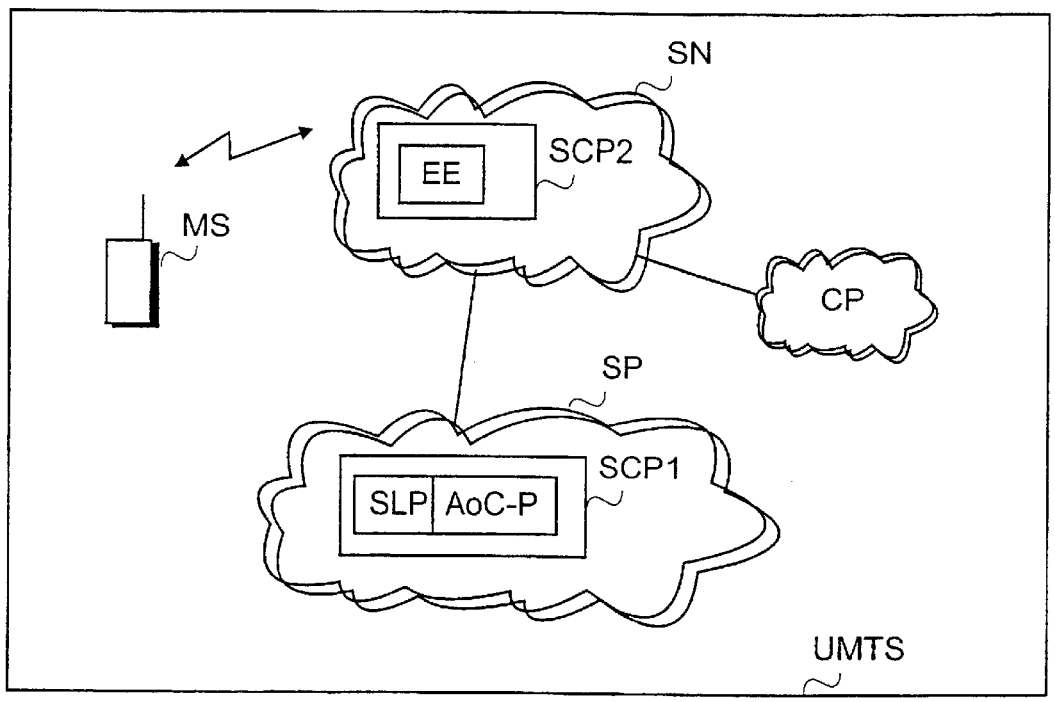
FIG. 1 illustrates the architecture of a telecommunications system.

FIG. 1 shows the network architecture of the UMTS system on a general level, since a more detailed network structure bears no essential significance with regard to the invention. Third-generation mobile communication systems separate a service provider SP and a network operator from each other. A service provider offers services to an end-user through a network SN of one or more network operators. This type of network SN that provides services is called a serving network. A service provider can offer services through a serving network SN of one or more network operators. In addition, a service provider may switch to another serving network during the service without the user noticing it. A service provider can also be a network operator. In addition to the service provider, one or more value added service providers and/or content providers can be used to provide the service. These are referred to as CP in FIG. 1. In the following, the term 'service provider' is used of the service provider from which the subscriber has ordered the service. Value added service providers and content providers are, in the following, referred to as sub-providers. The service provider of an A service can be a sub-provider of a B service and vice versa.

For providing a service, the service provider's network has at least one service control point SCP1, with which the functions are controlled so as to produce intelligent network services. In connection with an intelligent network service, a service logic program SLP is initiated and a service logic instance is created to provide the service. The service logic is initiated either in the service control point or it is loaded during initiation into the service network or terminal, for instance. In a first preferred embodiment of the invention, each service logic program is associated with its own advice of charge calculation algorithm program AoC-P. The AoC-P is a logical price definition element containing information on the formation mechanism of the service price and on the calculation parameter values which it needs as input to be able to calculate the advice of charge. The price definition element is loaded in the execution environment during the initiation of the service logic to calculate the advice of charge of the service requested by the caller. The price definition element is described in greater detail in FIG. 2. When each service logic program is associated with its own price definition element AoC-P, it is possible to freely define the needed parameters and their number taking into account the individual characteristics of each service.

In some other embodiments, an identifier or some other indication of the price definition element used can be associated with the service logic program. It is also possible to associate a price definition element with the service logic program, when the service logic program uses various network elements in a versatile manner to provide the service, and an indication of the price definition element to be used with more simple service logic programs. This way, the same calculation algorithm need not be stored several times. For current services using a prior art calculation algorithm, for instance, just a reference to the calculation algorithm is enough. Some embodiments do not necessarily even need a reference, since the lack of the price definition element or its indication in the service logic program can mean that the prior art calculation algorithm is to be used. It is essential that there are at least two price definition elements for calculating the advice of charge and that there is some indication as to which element each service uses. The term 'standard price definition element' can also be used of a prior art advice of charge.

FIG. 1 does not show a detailed structure of the serving network, as it bears not significance with regard to the invention. In the UMTS system, the serving network SN comprises an actual access network AN and one or more core networks CN. The access network AN handles mainly matters related to the radio path, i.e. it offers the core network the radio access necessary for wireless operation. The core network CN can be any conventional telecommunications network or a future telecommunications network modified to efficiently utilize the access network in wireless communication. The core network can be a GSM network or a GSM 2+network, for instance. Connections to other networks are established through the core network. Other networks can be other networks in the UMTS system, data networks and the public switched telephone network, for instance. In the first preferred embodiment of the invention, the serving network SN comprises an intelligent network service control point SCP2. Alternatively, or in addition to the SCP2, one of the network elements in the serving network may comprise an intelligent network service control function SCF or an interface to one. The SCF controls the functions to produce intelligent network services. In the first preferred embodiment of the invention, the execution environment EE of the advice of charge is located in the intelligent network service control point SCP2 of the serving network. The execution environment can also reside in another network element or even in the mobile station. It is enough for the serving network SN that it can forward the calculated advice of charge to the mobile station and the parameters needed to calculate the advice of charge to the execution environment.

The mobile station MS comprises actual mobile equipment ME and a detachably connected identification card USIM, also called a subscriber identity module. In this context, a mobile station MS generally means the entity formed by the subscriber identity module and the actual mobile equipment. The mobile station MS can be a simplified apparatus transmitting speech only or it can be an apparatus providing versatile services, acting as a service platform and supporting the loading and execution of functions related to various services. It can, for instance, comprise an execution environment T-SCF of an intelligent network service logic corresponding to the service control function on the network side. The execution environment EE of the price definition element can also reside in an advanced mobile station MS. Mobile equipment ME can be any apparatus or combination of apparatuses capable of communicating in a mobile system, for instance a multimedia computer with a Nokia card phone connected to it to provide a mobile connection. The only requirement for a mobile station of the invention is that it is capable of forwarding a service request from the user to the network and the price data indicated by the advice of charge of the service to the user.

Mobile stations usually have two meters for advice of charge, one for metering the charging units of the call in progress and one for metering the charging units of both the call in progress and the earlier calls. These charging units can be adapted to add together advice of charge amounts which can be received periodically, as described in greater detail in FIG. 3.

It should be further emphasized that it is not significant for the invention where the price definition element of the advice of charge and the service logic of the service using it are located. They can reside in different places. The price definition element can be made a fixed part of the service logic, even though their execution environments were in different places.

Figure 2:
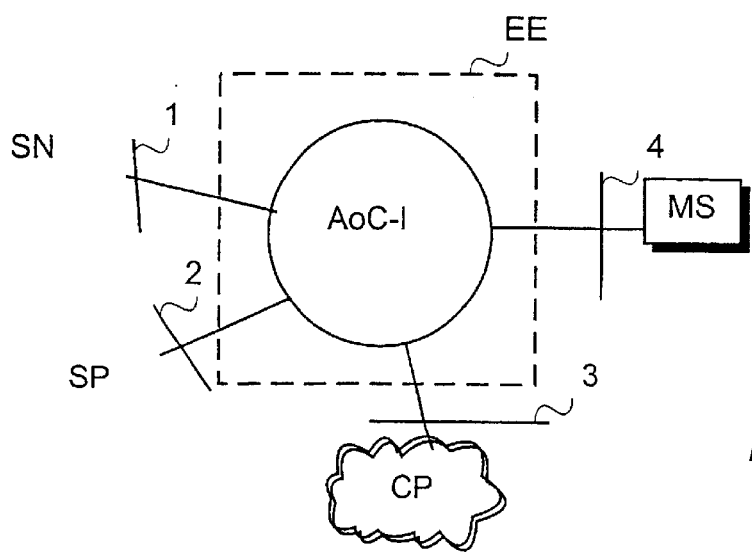
FIG. 2 shows a block diagram of the structure of an advice of charge instance.

FIG. 2 shows an example of a logical price definition element (or, more precisely, the instance which implements it) AoC-I which calculates the advice of charge. In the first preferred embodiment, the price definition element is loaded into the execution environment EE in the serving network, preferably in the intelligent network service control point, during initiation of the service. The execution environment is preferably a Java virtual computer or the like, which does not in any way limit the structure and/or implementation of the price definition element. The invention can, however, be implemented in another kind of execution environment, too. The execution environment can also reside in a mobile station or another terminal. If the execution environment is in the serving network, using advice of charge in billing is slightly simpler and requires less signalling.

In FIG. 2, the price definition element has an interface 1 to the serving network SN, an interface 2 for the service provider SP and interfaces 3 to the sub-providers CP for forwarding calculation parameter values and, naturally, an interface 4 to the mobile station MS for transmitting advice of charge data to the mobile station MS. If the service does not use sub-providers CP, the price definition element associated with the service does not require the interface 3. Correspondingly, if the price definition element of the advice of charge does not need information from the serving network, the interface 2 can be left out of the element. The price definition element AoC-I may also have other interfaces than those shown in FIG. 2. The price definition element may have an interface to the billing system, for instance. This way, advice of charge data can also be used as billing data.

The price definition element receives calculation parameter values through interfaces 1, 2 and 3. This data affecting the price formation include the amount of service usage, for instance used time or number of transmitted bits, and the amount of content transmitted to the user, for instance the number of map frames transmitted in a map service. Correspondingly, the price definition element can request calculation parameter values through these interfaces. The elements participating in providing the service monitor their billing data for each connection, if necessary, and can provide the values requested by the price definition element. The service provider usually agrees with the other parties participating in providing the service on what parameters will be used, how their values are forwarded and how the number of values are metered, for instance. This way, the service provider is able to create a price definition element for a service.

In the first preferred embodiment of the invention, the price definition element AoC-I is adapted to request charging parameter values through the interfaces from the network elements that participate in providing and/or forwarding the service. The price definition element AoC-I of a map service, for instance, may comprise the following price formation mechanism:

Advice of charge=service initiation fee+map charge+ (amount of transmitted data)*(price/Mbyte)+(used time)*(price/second).

To determine the amount of the service initiation fee, the price definition element is adapted to request it from the service provider SP through the interface 2. The amount of the map charge is checked from the local sub-provider CP through the interface 3. The amount of transmitted data and the used time is checked from the serving network SN through the interface 1. The values of these parameters can be checked periodically or when releasing a connection depending, for instance, on whether it is a case of a one-time map delivery or monitoring one's own location on the map. The prices can be checked either from the service provider SP or the serving network SN. From which of them they are checked depends on the definitions made by the service provider in the price definition element of the advice of charge AoC-P.

In some embodiments, the service logic or a separate calculation parameter service logic takes care of requesting the calculation parameters.

In the first preferred embodiment of the invention, the AoC-I is also adapted to receive changed parameter values, such as a change in the price/second data when the charge changes during a call, from the network elements participating in providing the service. In the first preferred embodiment, the AoC-I is also adapted to use the changed values in events occurring after their reception. For instance, used time is charged according to the earlier price before the change and according to the changed price after the change.

Figure 3:
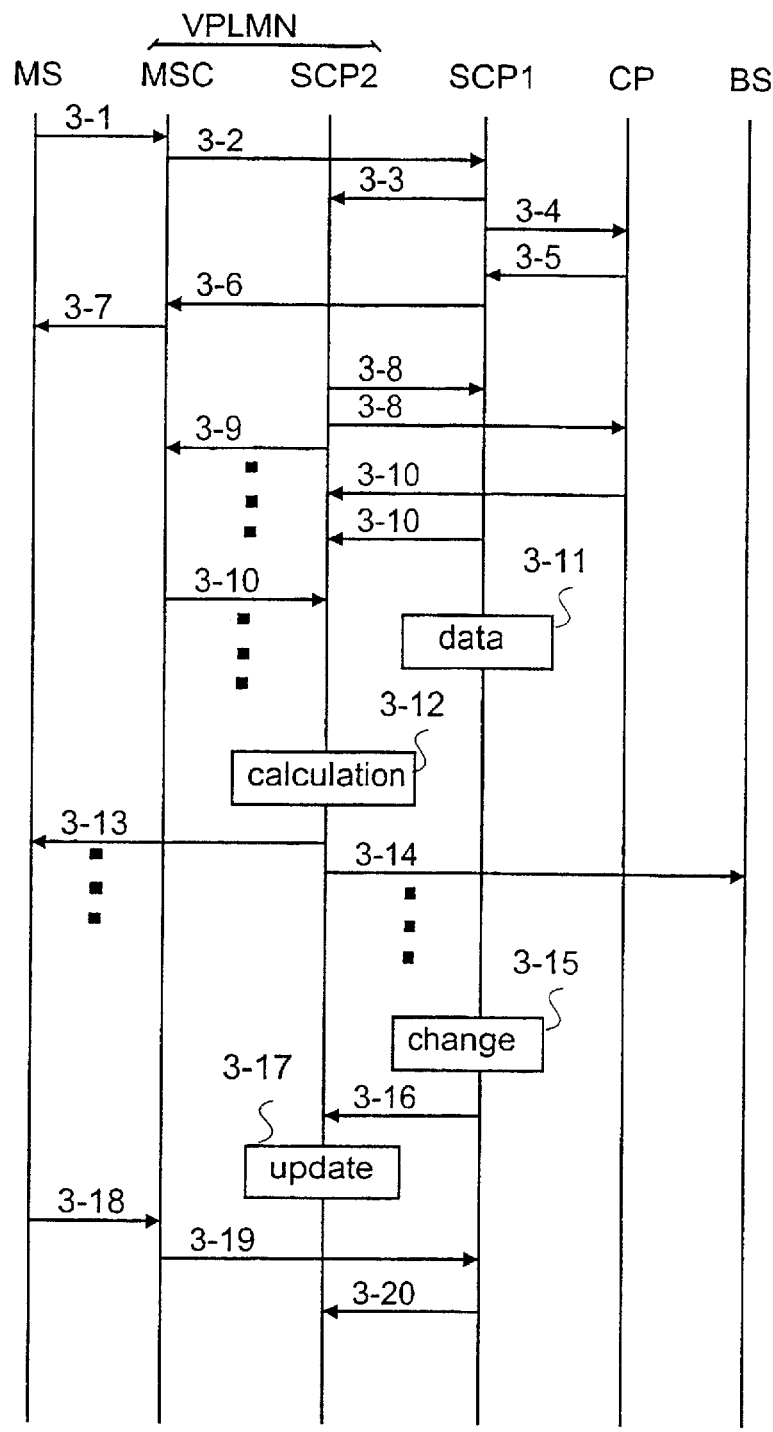
FIG. 3 shows an example of data transmission according to the invention.

FIG. 3 shows an example of data transmission between logical connections according to the invention. FIG. 3 starts in a situation where the user of a mobile station MS sends a service request to the serving network SN in message 3-1. The serving network can be a visited mobile network VPLMN, for instance. A mobile switching centre MSC in the serving network notices that the service request concerns an intelligent network service and checks the address of the intelligent network service control point related to the service from the subscriber data in the visitor location register. In this example, it is the intelligent network service control point SCP1 of the service provider (for instance the home network HPLMN). The mobile switching centre MSC sends message 3-2 initiating the service logic to the SCP1. The SCP1 receives the message, initiates the service logic and in message 3—3 loads the price definition element (AoC-I) associated with the service logic to the execution environment in the network. During loading, it preferably provides the addresses of the network elements (MSC, CP) participating locally in providing the service. They are obtained on the basis of the MSC which initiated the service logic, for instance. The addresses of its own network elements are preferably a fixed part of the price definition element, because they are standard information, i.e information which is the same to all service users regardless of where they are located. In the example in FIG. 3, the execution environment is located in the service control point SCP2 of the serving network. In message 3-4, the SCP1 sends, according to the service logic instructions, a request to a network element of a sub-provider CP participating in providing the service. In message 3-4, the CP is requested to send to the SCP1 the part of the service needed for providing the service, for instance a local map, with which the user can monitor his or her location in the centre of a new city. The network element of the sub-provider CP sends the requested part, for instance a map, in message 3-5 to the SCP1. After receiving it, the SCP1 sends the requested part (map) and location information it has possibly added to it in message 3-6 to the mobile switching centre MSC which forwards it (the requested part and possibly added information) to the mobile station of the user in message 3-7. This way, the service has been made available to the user and it is continuously provided for him or her. The data transmission related to the actual provision is, however, not shown in the example.

At the same time, the price definition element loaded onto the SCP2 requests in messages 3-8 through the SCP2 the calculation parameter values it needs to provide the service from the network elements participating on a one-time basis in providing the service. In the example in FIG. 3, these are the CP and the SCP1. The value of one or more parameters can be requested from one network element in one message. One-time basis refers to the fact that the parameter value does not change according to the use of the service. In addition, in the example in FIG. 3, the SCP2 requests at certain intervals in messages 3-9 from the mobile switching centre MSC participating in providing the service information on used time. According to prior art, the mobile switching centre collects information on the used time, for instance. The SCP2 receives the parameter values it requested in messages 3-10.

Because a value of a parameter whose value varies according to the time of the day was requested from the SCP1, it stores in step 3-11 into its cache, for instance, the data that it needs to send the possibly changing parameter value to the price definition element in SCP2.

When the SCP2 has obtained all necessary parameter values, it starts calculating the advice of charge in step 3-12. Next, it sends periodically or at predefined intervals the advice of charge to the mobile station in messages 3-13 and to the billing system BS in messages 3-14. This provides the advantage that information need not be collected separately for billing, whereby the signalling load decreases. In some other embodiments, the advice of charge can be sent only after the call which initiated the service is ended. It is also possible to send messages 3-13 periodically and message 3-14 only after the call which initiated the service is ended. Sending messages 3-13 and 3-14 need thus not occur at the same time. By periodical sending, the data becomes more real-time as does charging prepaying subscribers, for instance.

In FIG. 3, while the call which initiated the service is still ongoing, it is detected in step 3-15 in the SCP1 that the parameter value sent to the SCP2 has changed. Therefore, the SCP1 sends in message 3-16 the changed parameter value to the SCP2 where it is updated for use by the calculation algorithm in step 3-17. After this, the advice of charge is calculated with the new parameter value.

Calculating the advice of charge is continued until the user no longer needs the service and sends a notification of this in message 3-18. The mobile switching centre MSC sends information on this in message 3-19 to the SCP1 and the SCP1 stops the calculation of the advice of charge by sending message 3-20 through the SCP2 to the price definition element. At the same time, the SCP1 deletes from its cache information on parameter value updating concerning this particular price definition element.

It is also possible that the price definition element requests the parameter values it needs only after receiving message 3-20. This information could be the number of forwarded map frames. In such a case, the CP, for instance, should be adapted to maintain information on the number of map frames it forwards.

If other network elements than the SCP1 participating in providing the service have in their cache the information necessary for updating the parameter values, then depending on the application either the SCP1 or the price definition element through the SCP2 sends them a notification on the fact that the user has stopped using the service. The mobile switching centre MSC receives information on this in message 3-18.

The parameter values can also be sent as a broadcast, in which case the price definition element must monitor the broadcasts of the network elements (or some of them) participating in providing the service and get the necessary parameter values from them. The price definition element can also request the parameter values at certain intervals to make sure that they correspond to the current situation. The implementation manner depends on the agreements made between the service provider and the other parties and on how the functions have been defined in the price definition element.

In another embodiment of the invention, the SCP1 can, instead of messages 3-4, 3-5 and 3-6, send in message 3-4 according to the instructions of the service logic an instruction to the mobile switching centre MSC to request from the network element of the sub-provider CP participating in providing the service the part needed for the service, which part the MSC then requests from the CP in message 3-5 and receives in message 3-6.

In another embodiment of the invention, the service logic in the SCP1 can check before sending message 3-3 whether the subscriber requesting the service is a prepaying subscriber or a subscriber who will be billed afterwards. If the subscriber is a prepaying subscriber, a price definition element is loaded on the SCP2 to send the advice of charge periodically to the billing system. Otherwise, a price definition element is loaded to send the advice of charge to the billing system only after the user has stopped using the service. These alternative price definition elements are otherwise the same; their price formation mechanism and the necessary parameter values are the same. It is, however, possible to reduce the signalling load in the network with this kind of separation.

The signalling messages described above in FIG. 3 are for the purpose of illustration only and may comprise several separate messages for transmitting the same information. The messages may also contain other information. Other signalling messages can also be used to transmit information. It is also not necessary to send all the described messages, messages 3-14, for instance, are not sent in all embodiments. Depending on the service and used data transmission system, other network elements, to which various functionalities have been distributed, can also participate in data transmission and signalling. A serving support node SGSN of a general packet radio service GPRS can, for instance, be used instead of the mobile switching centre. The presented messages illustrate one example only and their order, for instance, is not significant. If the execution environment is in the mobile station, the signalling messages of the SCP2 can be set to be transmitted by the mobile station.

It is obvious to a person skilled in the art that while technology advances, the basic idea of the invention can be implemented in many ways. The invention and its embodiments are thus not limited to the examples described above, but may vary within the scope of the claims.

What is claimed is:

1. A method for calculating advice of charge for a telecommunications system service, the service being other than an advice of charge service, the method comprising:

maintaining, in the telecommunications system, at least a first advice of charge calculation algorithm and a second advice of charge calculation algorithm, the first advice of charge calculation algorithm containing information about a first formation mechanism of a service price and about calculation parameter values which the first advice of charge calculation algorithm needs as input to calculate an advice of charge, and the second advice of charge calculation algorithm containing information about a second formation mechanism of a service price and about calculation parameter values which the second advice of charge calculation algorithm needs as input to calculate an advice of charge, associating with the service an indication of the advice of charge calculation algorithm to be used for calculating the advice of charge for the service, and calculating the advice of charge for the service using the indicated advice of charge calculation algorithm.

2. The method of claim 1, wherein the advice of charge calculation algorithm to be used is indicated by associating it with service logic of the service.

3. The method of claim 1, wherein the advice of charge calculation algorithm to be used is indicated by associating its identifier with the service logic of the service.

4. The method of claim 1, wherein one of the maintained advice of charge calculation algorithms is a standard advice of charge calculation algorithm and another is a dedicated advice of charge calculation algorithm, the dedicated advice of charge calculation algorithm to be used is indicated by associating it with service logic of the service, and the advice of charge of the service is calculated by the standard advice of charge calculation algorithm, if there is no advice of charge calculation algorithm associated with the service logic.

5. The method of claim 1, wherein one of the maintained advice of charge calculation algorithms is a standard advice of charge calculation algorithm and another is a dedicated advice of charge calculation algorithm, the dedicated advice of charge calculation algorithm to be used is indicated by associating the advice of charge calculation algorithm identifier with service logic of the service, and the advice of charge of the service is calculated by the standard advice of charge calculation algorithm, if there is no identifier for an advice of charge calculation algorithm associated with the service logic.

6. The method of claim 1, wherein the calculation parameter values to be used in the advice of charge calculation algorithm are requested from system components participating in providing the service.

7. The method of claim 1, wherein a change in a calculation parameter value is detected in a system component participating in providing the service, and a parameter value used by the advice of charge calculation algorithm is updated to correspond to the changed value.

8. The method of claim 1, wherein the advice of charge is transmitted to the billing system.

9. The method of claim 1, wherein the advice of charge is transmitted at predefined intervals.

10. A telecommunications system maintaining at least a first advice of charge calculation algorithm and a second advice of charge calculation algorithm, the first advice of charge calculation algorithm containing information about a first formation mechanism of a service price and about calculation parameter values which the first advice of charge calculation algorithm needs as input to calculate an advice of charge, and the second advice of charge calculation algorithm containing information about a second formation mechanism of a service price and about calculation parameter values which the second advice of charge calculation algorithm needs as input to calculate an advice of charge; and comprising at least a service provider for providing a service to subscribers, the service being other than an advice of charge service, the service provider being adapted to indicate an advice of charge calculation algorithm to be used in the advice of charge service;

a serving network for forwarding the service to a user; and an execution environment for calculating the advice of charge of the service, the execution environment being adapted to calculate the advice of charge of the service by the indicated advice of charge calculation algorithm.

11. The telecommunications system of claim 10, wherein the service provider is adapted to indicate the advice of charge calculation algorithm to be used by loading it in the execution environment.

12. The telecommunications system of claim 10, wherein each of the advice of charge calculation algorithms is adapted to request the calculation parameter values it needs from system components participating in providing the service, and those system components are adapted to transmit the calculation parameter values to the requesting advice of charge calculation algorithm.

13. The telecommunications system of claim 12, wherein each system component participating in providing the service is adapted, as a response to a change in a calculation parameter value, to transmit the changed value to an advice of charge calculation algorithm which has requested calculation parameter values from the system component, and each advice of charge calculation algorithm is adapted, as a response to a changed value, to update the calculation parameter value.

14. The telecommunications system of claim 10, wherein each advice of charge calculation algorithm is adapted to forward the advice of charge of the service to the billing system.

15. The telecommunications system of claim 14, wherein the billing system is a prepaid system.

16. The telecommunications system of claim 11, wherein the execution environment of the advice of charge calculation algorithm is in the serving network.

17. The telecommunications system of claim 11, wherein the execution environment of the advice of charge calculation algorithm is in a mobile station of the user of the service.

18. A network element of a telecommunications system maintaining at least a first advice of charge calculation algorithm and a second advice of charge calculation algorithm, the first advice of charge calculation algorithm containing information about a first formation mechanism of a service price and about calculation parameter values which the first advice of charge calculation algorithm needs as input to calculate an advice of charge, and the second advice of charge calculation algorithm containing information about a second formation mechanism of a service price and about calculation parameter values which the second advice of charge calculation algorithm needs as input to calculate an advice of charge, which network element is adapted to contain a service logic or an address to a service logic, with which service logic, a service is provided, the service being other than an advice of service charge service, and the network element being adapted to associate the service logic and one of the advice of charge calculation algorithms used in calculating the advice of charge of the service with each other and to indicate the associated advice of charge calculation algorithm when the service logic is used.

19. The network element of claim 18, wherein the network element is adapted to indicate the advice of charge calculation algorithm by loading it into the telecommunications system when the service logic is initiated.

* * * * *

UNITED STATES PATENT AND TRADEMARK OFFICE
CERTIFICATE OF CORRECTION

PATENT NO. : 6,865,262 B1
DATED : March 8, 2005
INVENTOR(S) : Hakan Mitts et al.

It is certified that error appears in the above-identified patent and that said Letters Patent is hereby corrected as shown below:

<u>Title page,</u>
Item [22], Filed, replace "Jan. 18, 2000" with -- Jan. 28, 2000 --.

Signed and Sealed this

Sixth Day of September, 2005

JON W. DUDAS
*Director of the United States Patent and Trademark Office*